United States Patent
Orihara

(10) Patent No.: US 8,450,608 B2
(45) Date of Patent: May 28, 2013

(54) ELECTRICAL JUNCTION BOX

(75) Inventor: Atsuro Orihara, Yokkaichi (JP)

(73) Assignee: Sumitomo Wiring Systems, Ltd., Mie (JP)

( * ) Notice: Subject to any disclaimer, the term of this patent is extended or adjusted under 35 U.S.C. 154(b) by 236 days.

(21) Appl. No.: 12/970,195

(22) Filed: Dec. 16, 2010

(65) Prior Publication Data
US 2011/0174514 A1    Jul. 21, 2011

(30) Foreign Application Priority Data

Jan. 18, 2010   (JP) .................... 2010-008412

(51) Int. Cl.
*H02G 3/08*       (2006.01)
(52) U.S. Cl.
USPC ............. 174/50; 439/535; 248/906; 174/58
(58) Field of Classification Search
USPC ............ 174/50, 58; 439/535; 248/906, 343; 220/4.02
See application file for complete search history.

(56) References Cited

U.S. PATENT DOCUMENTS

| | | | | |
|---|---|---|---|---|
| 2,442,697 A | * | 6/1948 | Krohm | 403/254 |
| 4,869,455 A | * | 9/1989 | Weeks | 248/674 |
| 7,214,876 B1 | * | 5/2007 | Haberek et al. | 174/58 |
| 8,022,297 B1 | * | 9/2011 | Thibault | 174/50 |

FOREIGN PATENT DOCUMENTS

| | | |
|---|---|---|
| JP | U-7-42535 | 8/1995 |
| JP | A-10-223330 | 8/1998 |

* cited by examiner

*Primary Examiner* — Dhirubhai R Patel
(74) *Attorney, Agent, or Firm* — Oliff & Berridge, PLC

(57)         ABSTRACT

An object of the present invention is to provide an electrical junction box having a new structure that can restrain noises from leaking through a support member and can advantageously secure a fixing strength onto the support member in the electrical junction box fixed on a support member by inserting an arm section projecting from a box main body into an attaching aperture in the support member. An arm section is loosely inserted into a support member. The arm section is provided on its extending distal end with an engaging portion that is pushed through an attaching aperture in the support member into an interior of the support member to be engaged with a rear surface of the support member. The arm section is integrally provided with a first wall portion opposed through the support member to the engaging portion. The first wall portion covers the attaching aperture.

7 Claims, 3 Drawing Sheets

[Fig. 1]
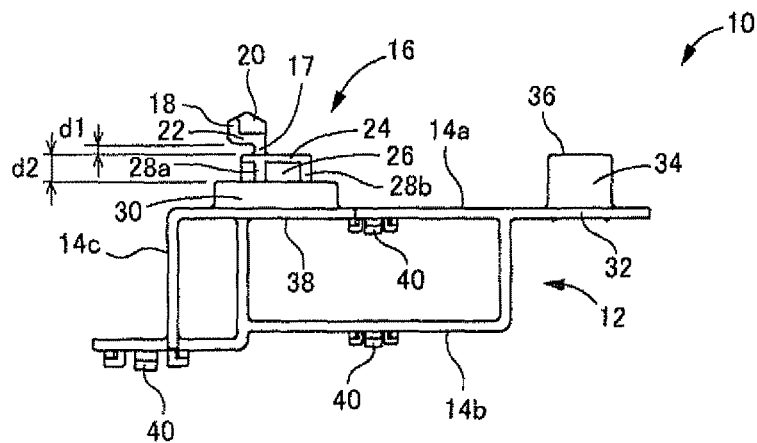
[Fig. 2]
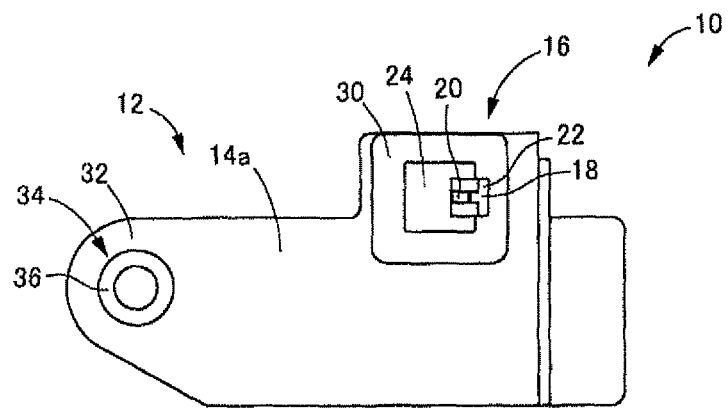

[Fig. 3]
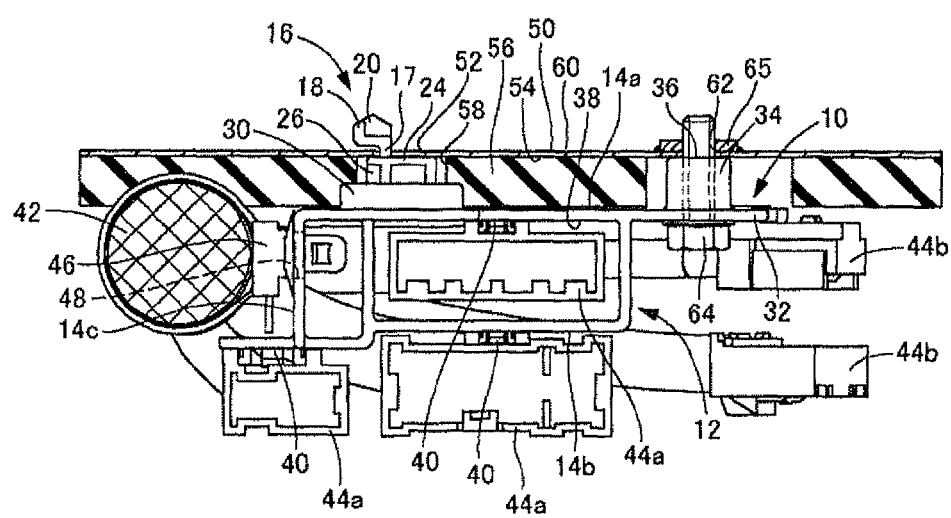
[Fig. 4]
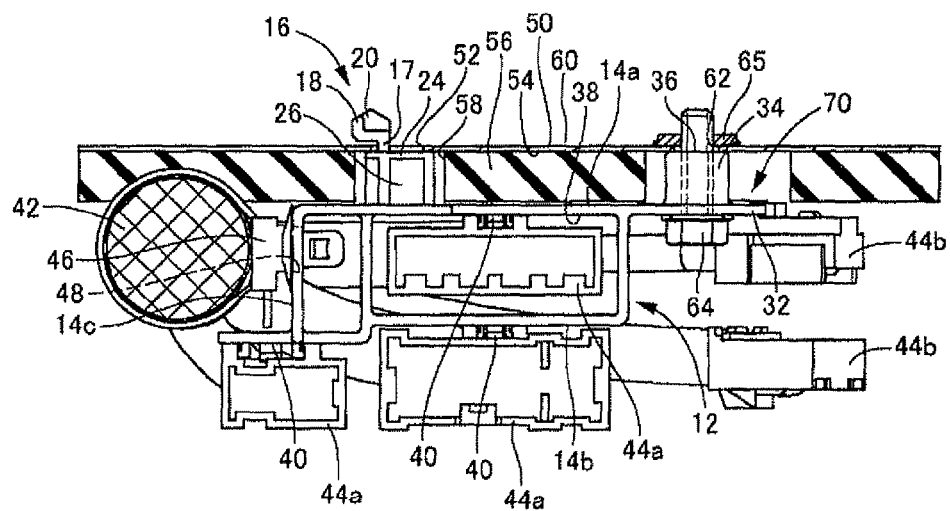

[Fig. 5]
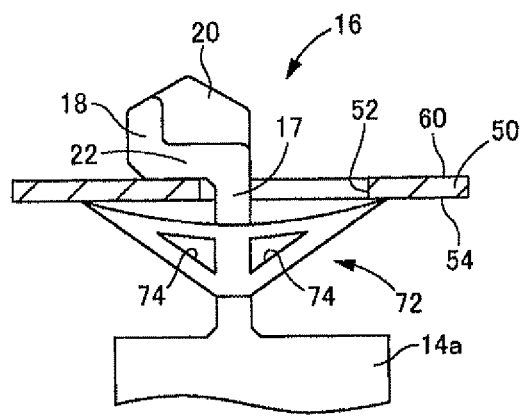
[Fig. 6]
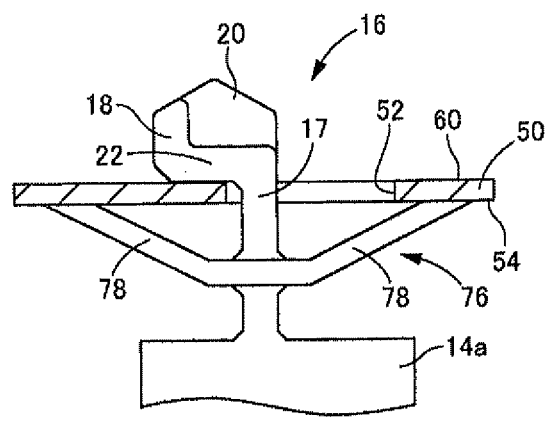

ELECTRICAL JUNCTION BOX

BACKGROUND

The disclosure relates to an electrical junction box to be mounted on a motor vehicle, and more particularly relates to an electrical junction box to be attached to a support member such as a vehicle body panel or the like.

BACKGROUND ART

An electrical junction box such as a fuse box, a junction box, or a connector holder has been used in an electrical equipment system for a motor vehicle. The electrical junction box is attached to a support member such as a vehicle body panel by a bolt or the like in a vehicle room or an engine room.

An example of the electrical junction box to be mounted on the vehicle body panel has been disclosed in JUM HEI 7 (1995)-42535 A (Patent Document 1). In this electrical junction box, an arm section projects from the vehicle body panel at a single position to be attached to the vehicle body panel. The arm section is inserted into an attaching aperture in the vehicle body panel to be engaged with a rear surface of the vehicle body panel. Thus, it is possible to reduce bolt-fixing positions, the number of parts, and assembling steps.

However, since the arm section is inserted into the attaching aperture in the electrical junction box disclosed in Patent Document 1, a clearance is caused between the arm section and the attaching aperture when the electrical junction box is attached to the vehicle body panel. Consequently, noises such as sounds outside the vehicle body or engine sounds inside the vehicle body will likely enter the vehicle room through the clearance. If only a pair of projections extending outward from the arm section clamp the vehicle body panel to secure the electrical junction box to the vehicle body panel, it is not always possible to obtain a sufficient fixing strength. There will be a possibility that the arm section will be disconnected from the vehicle body panel on account of vibrations during moving.

SUMMARY

In view of the above problems, embodiments provide an electrical junction box having a new structure that can restrain noises from leaking through a support member and can advantageously secure a fixing strength onto the support member in the electrical junction box fixed on a support member by inserting an arm section projecting from a box main body into an attaching aperture in the support member.

A first aspect may include an electrical junction box wherein an arm section projecting from a box main body is loosely inserted into an attaching aperture in a support member, the arm section is engaged with the support member, and the box main body is fixed on the support member. The arm section is provided on a projecting distal end with an engaging portion that is inserted through the attaching aperture into an interior of the support member to be engaged with a rear surface of the support member. The arm section is integrally provided with a first wall portion that is opposed through the support member to the engaging portion. The first wall portion is adapted to cover the attaching aperture.

In embodiments of the first aspect, since the first wall portion integrated with the arm section covers the attaching aperture when the box main body is mounted on the support member, it is possible to close the clearance between the attaching aperture and the arm section. Thus, it is possible to restrain the noises from entering the vehicle room through the clearance, thereby accomplishing an excellent sound insulation effect. Accordingly, in the case where the box main body is mounted on a support member (for example, a vehicle body panel) in a vehicle room, it is possible to restrain the noises outside the vehicle body or engine noises inside the vehicle body from entering the vehicle room through the attaching aperture, thereby enhancing stillness in the vehicle room.

Furthermore, it is possible to secure a great contact area on the support member by the first wall portion. Since the first wall portion covers the attaching aperture to contact with a whole peripheral edge around the attaching aperture, it is possible to restrain the arm section loosely inserted in the attaching aperture from being vibrated. Thus, it is possible to keep stable engagement of the arm section with the support member and to advantageously secure a fixing strength of the arm section on the support member. In particular, since the first wall portion is integrated with the arm section, it is possible to enhance the fixing strength without involving an increase of the number of parts. In addition, since the first wall portion contacts with the surface of the support member, it is possible to precisely restrict an amount of inserting the arm section into the support member. Thus, it is possible to easily and stably position the arm section on the support member, thereby enhancing an attaching work of the electrical junction box on the support member and stabling an engagement condition.

The arm section is inserted in the attaching aperture with a play. For example, it is possible to avoid a problem in built-in structure that the support member must be broken in order to remove the arm section from the support member on account of fixing the arm section on the support member. Thus, it is easy to remove the arm section from the support member, thereby securing an excellent maintenance. That is, according to embodiments, since the arm section is loosely inserted in the attaching aperture, it is possible to secure a maintenance and to restrain the noises from entering the vehicle body through the clearance between the arm section and the attaching aperture, thereby achieving compatibility between maintenance and stillness.

A second aspect may include an electrical junction box according to the first aspect. In the electrical junction box in the second aspect, an insulator is adhered to a surface of the support member. The insulator is provided with a communication aperture that is communicated with the attaching aperture. The arm section is integrally provided with a second wall portion for covering the communication aperture.

In embodiments of the second aspect, since the second wall portion closes the clearance between the arm section and the communication aperture in the insulator, it is possible to obtain an excellent sound insulation effect. In particular, in many cases, the insulator is made of an elastic material on account of requirement for a sound insulation effect. Accordingly, since the insulator is clamped between the second wall portion and the support member to be compressed between them, it is possible to press the engaging portion of the arm section onto the rear surface of the support member by artfully utilizing resilience of the insulator. Thus, it is possible to more stably fix the arm section on the support member.

A third aspect may include an electrical junction box according to the first or second aspect. In the electrical junction box in the second aspect, the first wall portion is elastically deformable in a pushing direction onto the support member. The engaging portion is pressed onto a rear surface of the support member by resilience of the first wall portion.

Thus, it is possible to more stably fix the arm section on the support member. The first wall portion can be elastically deformable by setting, for example, a shape suitably. A specific elastically deformable configuration may be, for example, a curved plate-like configuration having an arc-shape in cross section spaced apart from the support member, or a bent plate-like configuration having a pair of gate-like legs in cross section that spread toward the support member.

A fourth aspect may include an electrical junction box according to any one of the first to third aspects. In the electrical junction box in the fourth aspect, the arm section is provided on the projecting distal end with a tapered sharp portion in a projecting direction of the arm section.

Thus, it is possible to easily insert a distal end of the arm section into the attaching aperture in the support member. That is, according to embodiments, since the arm section is provided with the first wall portion, it is possible to easily insert the arm section into the attaching aperture by providing the sharp portion on the arm section, although the first wall section will be an obstacle for viewing the attaching aperture. It is possible to facilitate the attaching work, since the sharp portion of the arm section can be easily inserted into the attaching aperture.

According to embodiments, the arm section is loosely inserted in the attaching aperture in the support member, and the arm section is integrally provided with the first wall portion that is opposed to the engaging portion to be engaged with the support member. Thus, the first wall portion covers the attaching aperture, thereby restraining the noises from leaking through the clearance between the attaching aperture and the arm section. Furthermore, since the first wall portion contacts with the support member, it is possible to secure a great contact area between the arm section and the support member, thereby restraining the arm section from being vibrated and maintaining the fixing condition of the arm section on the support member more stably.

BRIEF DESCRIPTION OF THE DRAWINGS

FIG. 1 is a top plan view of a first embodiment of an electrical junction box.

FIG. 2 is a side elevation view of the electrical junction box shown in FIG. 1.

FIG. 3 is an explanatory view of the electrical junction box shown in FIG. 1, illustrating the electrical junction box mounted on a vehicle body panel.

FIG. 4 is a an explanatory view of an embodiment of the electrical junction box, illustrating the electrical junction box mounted on the vehicle body panel.

FIG. 5 is an explanatory view of an embodiment of a main part of the electrical junction box.

FIG. 6 is an explanatory view of an embodiment of a main part of the electrical junction box.

DETAILED DESCRIPTION OF EMBODIMENTS

Referring now to the drawings, embodiments of an electrical junction box in accordance with the present invention will be described below.

FIG. 1 shows a top plan view of a first embodiment of an electrical junction box 10. FIG. 2 shows a side elevation view of the electrical junction box 10. The electrical junction box 10 is a connector holder. The electrical junction box 10 is a molded product made of nonconductive synthetic resin. The electrical junction box 10 is provided with a substantially parallelepiped box main body 12 that is open at both sides.

An arm section 16 projects from a side surface 14a of the box main body 12 opposed to a vehicle body panel 50. The arm section 16 projects from an end of the box main body 12 in a longitudinal direction (a right and left direction in FIG. 1).

The arm section 16 is provided with an extension 17 that extends orthogonally from the side surface 14a. The extension 17 is provided on its projecting distal end with a engaging portion 18 that projects orthogonally in an extending direction (an upward direction in FIG. 1) and projects outward in parallel to the side surface 14a in the longitudinal direction of the box main body 12. Thus, the arm section 16 is formed into a substantially L-shaped hook in a top plan view (FIG. 1) of the electrical junction box 10.

Furthermore, the arm section 16 is provided on its projecting end edge with a triangular sharp portion 20 that is tapered in the projecting direction (upward direction in FIG. 1). The arm section 16 is provided on the projecting end portion including the sharp portion 20 and engaging portion 18 with a substantially pentagonal shaped plate having a triangle shape at the top side. The pentagonal shaped plate is reinforced by a reinforcing rib 22 that projects in an upper and lower direction (upper and lower direction in FIG. 2) and that includes a projecting end edge of the engaging portion 18 located at a front side (left side in FIG. 1) in an inserting direction into the vehicle body panel (mentioned later) and a box main body side end edge of the engaging portion 18 to be locked on a rear surface 60 of the vehicle body panel 50. The extension 17 of the arm section 16 is formed into a substantially rectangular plate continued to the reinforcing plate 22 and having the same size as the reinforcing rib 22 in the upper and lower direction (in FIG. 2).

The arm section 16A is integrally provided on a proximal end of the extension 17 with a first wall portion 24. The first wall portion 24 is formed into a substantially square plate having a size larger than an attaching aperture 52 in the vehicle body panel 50. The first wall portion 24 spreads in perpendicular to a projecting plate 26 protruding from a second wall portion 30 at a projecting distal end edge of the projecting plate 26. The projecting plate 26 is provided with a pair of reinforcing ribs 28a and 28b projecting in the upper and lower direction (in FIG. 2). The one reinforcing rib 28a is substantially aligned on the extension 17 in a top plan view in FIG. 1. The other reinforcing rib 28b is provided on an end edge of the projecting plate 26 opposite from the engaging portion 18.

The extension 17 projects from the first wall portion 24. The extension 17 is located on the first wall portion 24 at a slightly outward deviated position from a central part of the wall portion 24 in the longitudinal direction of the box main body 12. Thus, the engaging portion 18 is opposed to and spaced apart from the first wall portion 24 by a given distance. A distance d1 between the engaging portion 18 and the first wall portion 24 is set to be slightly larger than a size in thickness of an opening peripheral edge around the attaching aperture 52 in the vehicle body panel 50. The projecting end portion from the extension 17 of the engaging portion 18 projects outward from the first wall portion 24.

The arm section 16 is provided with the second wall portion 30 on the proximal end of the first wall portion 24. The second wall portion 30 is formed into a substantially square plate projecting from the side surface 14a of the box main body 12. The second wall portion 30 has a size larger than that of a communication aperture 58 in an insulator 56. The first wall portion 24 projects through the projecting plate 26 from the second wall portion 30. The first wall portion 24 is disposed on a central position of the second wall portion in side view of the electrical junction box 10 (see FIG. 2). A projecting distance d2 of the first wall portion 24 from the second wall portion 30 is set to be slightly smaller than a size in thickness of the insulator 56.

Thus, the arm section 16 in the first embodiment is integrally provided on the proximal end from the box main body 12 with the second wall portion 30 and the first wall portion 24 in order near the box main body 12. The extension 17 extends from the first wall portion 24. The extension 17 is provided on an extending end with the engaging portion 18.

The box main body 12 is provided with a projecting piece portion 32, which extends outward in the longitudinal direction, on its side surface 14a on which the arm section 16 is provided. The projecting piece portion 32 is provided with a cylindrical bolt inserting portion 34 that extends in the same direction as the arm section 16. As shown in FIG. 1, a projecting end edge 36 of the bolt inserting portion 34 and the first wall portion 24 are substantially disposed on the same plane spreading in parallel to the side surface 14a.

Furthermore, the box main body 12 is provided on its suitable positions with lock portions 40 for coupling connectors 44a. The lock portions 40 in the first embodiment are so-called cassette locks that have been publicly known. The two lock portions 40 are provided on each of an inner surface 38 opposite from the side surface 14a of the box main body 12 and the side surface 14b spaced apart from the side surface 14a.

As shown in FIG. 3, in the electrical junction box 10 constructed above, a plurality of connectors 44a mounted on a wire harness 42 are coupled through the lock portions 40 to the box main body 12. Thus, in the first embodiment, a single connector 44a is contained in the box main body 12. Two connectors 44a, 44a are attached to the side surface 14b of the box main body 12. The other connectors 44b mounted on the wire harness 42 are connected to connectors on another wire harness or to the other electrical equipments or the like. The wire harness 42 is provided with an attaching member 46. The attaching member 46 is inserted into an inserting aperture 48 in one side surface 14c in the longitudinal direction of the box main body 12 to be attached to the side surface 14c.

The electrical junction box 10, on which the wire harness 42 and connectors 44a are mounted, is attached to the vehicle body panel 50 that serves as a support member. The vehicle body panel 50 is provided with an attaching aperture 52. The insulator 56 is adhered to a surface 54 of the vehicle body panel 50. The insulator 56 is made of an elastic material such as urethane foam. The insulator 56 is provided with a communication aperture 58 that is superimposed on the attaching aperture 52 in the vehicle body panel 50 to communicate with the attaching aperture 52.

When the engaging portion 18 of the arm section 16 in the electrical junction box 10 is inserted through the communication aperture 58 in the insulator 56 into the attaching aperture 52 in the vehicle body panel 50, the engaging portion 18 projects to a rear surface 60 of the vehicle body panel 50. Furthermore, the box main body 12 is slid on the vehicle body panel 50 in the projecting direction (direction from the right to the left in FIG. 3), with the engaging portion 18 projecting to the rear surface 60. Thus, the opening peripheral edge around the attaching aperture 52 in the vehicle body panel 50 is clamped between the opposed surfaces of the engaging portion 18 and the first wall portion 24 so that the engaging portion 18 and first wall portion 24 are opposed to each other through the vehicle body panel 50. Consequently, the engaging portion 18 is engaged with the rear surface 60 of the vehicle body panel 50 and the box main body 12 is temporarily secured to the vehicle body panel 50. The bolt inserting portion 34 of the box main body 12 is superimposed on the bolt inserting aperture 62 in the vehicle body panel 50 and the box main body 12 is secured to the vehicle body panel 50 by a bolt 64. The bolt 64 is screwed into a nut 65 welded on the rear surface 60 of the vehicle body panel 50 to be secured to the vehicle body panel 50. When the bolt 64 is under the fixed condition, the bolt inserting aperture 62 in the vehicle body panel 50 is covered by the projecting end edge 36 in the bolt inserting portion 34, thereby preventing noises from entering the vehicle room through the bolt inserting aperture 62. Thus, the box main body 12 is secured to the vehicle body panel 50.

As shown in FIG. 3, under the engaging condition of the box main body 12 with the vehicle body panel 50, the extension 17 of the arm section 16 is inserted in the attaching aperture 52 with a play. When the first wall portion 24 contacts with the surface 54 of the vehicle body panel 50 and the first wall portion 24 is superimposed on the attaching aperture 52 from the side of the surface 54, the attaching aperture 52 is covered by the first wall portion 24. Furthermore, the second wall portion 30 is superimposed on the communication aperture 58 in the insulator 56, and the communication aperture 58 is covered by the second wall portion 30.

According to the electrical junction box 10 constructed above, when the arm section 16 is engaged with the vehicle body panel 50, the box main body 12 can be easily and temporarily fixed to the vehicle body panel 50. Thus, it is possible to easily position the bolt inserting portion 34 and bolt inserting aperture 62 in the vehicle body panel 50 with respect to each other, thereby easily fixing them by the bolt. Since the arm section 16 is secured to the vehicle body panel 50, it is possible to reduce the number of the fixing bolts and to lower the number of assembling steps. Particularly, in the first embodiment, since the engaging portion 18 and extension 17 are deviated slightly outward from the central position of the first wall portion 24, inserting and engaging operations of the arm section 16 into and with the attaching aperture 52 can be easily effected. At the same time, since the projecting distal end of the arm section 16 is formed into the tapered sharp portion 20, the arm section 16 can be easily inserted into the communication aperture 58 and attaching aperture 52. Thus, regardless of the first wall portion 24 that is an obstacle in viewing, it is possible to easily insert the arm section 16 into the apertures 58 and 52.

In addition, since the arm section 16 is inserted in the attaching aperture 52 with the play, even in the case of removing the arm section 16 from the vehicle body panel 50, there is no problem that causes, for example, so-called built-in structure in the press-fixing process. It is possible to easily take the arm section 16 out of the vehicle body panel 50 without breaking the panel 50. In result, it is possible to secure an excellent maintenance.

Since the arm section 16 (specifically, extension 17) is loosely fitted in the attaching aperture 52, a clearance is caused between the arm section (specifically, extension 17) and the attaching aperture 52. However, since the first wall portion 24 integrated with the arm section 16 covers the clearance, it is possible to prevent noises from entering the vehicle room through the clearance between the arm section 16 and the attaching aperture 52 without increasing the number of components, thereby enhancing stillness in a vehicle room. Thus, according to the first embodiment, since the arm section 16 is loosely inserted in the attaching aperture 52, an excellent maintenance can be obtained and the first wall portion 24 can restrain the noises caused on account of loose fitting, thereby securing compatibility between maintenance and stillness.

Furthermore, since the first wall portion 24 contacts with the surface 54 of the vehicle body panel 50, it is possible to restrain the extension 17 inserted in the attaching aperture 52 from being vibrated. Thus, it is possible to stably maintain engagement between the arm section 16 and the vehicle body panel 50. Since the first wall portion 24 contacts with the surface 54 of the vehicle body panel 50, it is possible to precisely restrict an inserting amount of the arm section 16 in the attaching aperture 52, thereby enhancing accuracy of positioning the box main body 12 on the vehicle body panel 50. Particularly, in the first embodiment, since the projecting end edge 36 of the bolt inserting portion 34 is substantially disposed on the same plane as the first wall portion 24, it is possible to precisely position the box main body 12 in parallel to the vehicle body panel 50.

In addition, since the second wall portion 30 can cover the communication aperture 58 in the insulator 56, it is possible to exert an excellent antinoise effect. In particular, since the distance d2 between the first wall portion 24 and the second wall portion 30 is set to be smaller than the size in thickness of the insulator 56, while the second wall portion 30 compresses the insulator 56 between the second wall portion 30 and the vehicle body panel 50, the second wall portion 30 can cover the communication aperture 58, with box main body 12 being attached to the vehicle body panel 50. Thus, the second wall portion 30 covers the communication aperture 58 without causing any clearance, thereby accomplishing excellent stillness. Since the second wall portion 30 is biased in a direction departing from the vehicle body panel 50 by resilience of the insulator 56, it is possible to push the engaging portion 18 onto the rear surface 60 of the vehicle body panel 50, thereby securing a more strong fixing force.

Next, FIG. 4 shows a second embodiment of an electrical junction box 70. Hereinafter, explanations of the members and positions in this embodiment with the same signs as those in the first embodiment are omitted by giving the same signs in the first embodiment to the members and positions in the second embodiment.

The second embodiment of the electrical junction box 70 is not provided with the second wall portion 30 of the arm section 16 of the electrical junction box 10 in the first embodiment. Accordingly, in the second embodiment, the projecting plate 26 coupled to the first wall portion 24 projects directly from the side surface 14a of the box main body 12. As shown in FIG. 4, according to the second embodiment, when the electrical junction box 70 is mounted on the vehicle body panel 50, the projecting plate 26 is inserted into the communication aperture 58 in the insulator 56, and the first wall portion 24 covers the attaching aperture 52 in the vehicle body panel 50, as is the case with the first embodiment. It will be apparent from the second embodiment that the second wall portion 30 is not always necessary. According to the second embodiment, it is possible to enhance stillness while reducing production materials of the electrical junction box. The electrical junction box 70 according to the second embodiment can be suitably adopted in the vehicle body panel 50 that is not provided with the insulator 56.

It should be noted that the specific shapes of the first and second wall portions are not limited to those in the first and second embodiments. For example, FIG. 5 shows a third embodiment of a main part of the electrical junction box. A first wall portion 72 in the third embodiment is formed into a plate-like shape that spreads from the extension 17 of the arm section 16. When the electrical junction box in the third embodiment is mounted on the vehicle body panel 50, the first wall portion 72 is provided with a substantially arc-shaped surface that is spaced apart from the vehicle body panel 50 and reduces a thickness as the first wall portion 72 departs from the extension 17. The first wall portion 72 is provided in a position of the thick extension 17 with a plurality of concaved lightening holes 74 that are open outward.

In the third embodiment of the electrical junction box, when the arm section 16 is inserted into the attaching aperture 52, an outer peripheral edge around the first wall portion 72 is pushed to the vehicle body panel 50 in the inserting direction of the arm section 16 (upward direction in FIG. 5) to be elastically deformed. The engaging portion 18 is engaged with the rear surface 60 of the vehicle body panel 50 while the first wall portion keeps its elastic deformation. Thus, since the first wall portion 72 departs from the vehicle body panel 50 by resilience of the first wall portion 72, the engaging portion 18 can be pushed onto the rear surface 60.

According to the third embodiment, since the first wall portion 72 is formed into a elastically deformable shape, it is possible to press the engaging portion 18 onto the rear surface 60 of the vehicle body panel 50 by artfully utilizing the resilience exerted in the first wall portion 72. Thus, it is possible to obtain a strong fixing force. Since the first wall portion 72 can maintain the elastically deformed condition before returning to the initial free condition when the engaging portion 18 is engaged with the vehicle body panel 50, it is possible to press the outer peripheral edge around the first wall portion 72 to the surface 54 of the vehicle body panel 50 and to maintain a covering action onto the attaching aperture 52 in a stable condition. Since the first wall portion 72 is provided on its thick portion at the side of the extension 17 with the lightening hole 74, it is easy to elastically deform the first wall portion 72 having hard synthetic resin.

It should be noted that the elastically deformable first wall portion 72 is not limited to the configuration in the third embodiment. For example, FIG. 6 shows an alteration of a main part of the electrical junction box. A pair of legs 78, 78 of the first wall portion 76 may be formed into a gate-like configuration in cross section that spreads toward the vehicle body panel 50. Thus, if the first wall portion 72 is pushed onto the vehicle body panel 50 in the inserting direction of the arm section 16 (upward direction in FIG. 6), the pair of legs 78, 78 are elastically deformed to be spread. Since the pair of legs 78, 78 are likely to return to the original position so that the legs approach to each other by the resilience of the first wall portion 72, the engaging portion 18 is pushed onto the rear surface 54 of the vehicle body panel 50. Although the third embodiment (see FIG. 5) and the alteration (see FIG. 6) are provided with only the first wall portions 72, the second wall portions may be integrated with their arm sections.

The embodiments of the disclosure are described above in detail. It should be noted that the disclosure is not limited to the above embodiments. For example, although the second wall portion is not always necessary, the second wall portion may be superimposed on the insulator to cover the communication aperture so that the second wall portion does not compress the insulator.

The present invention is not limited to the connector holder. For example, the present invention can be applied to a fuse box, a relay box, a junction box, or the like. The number of bolt fixing portions and positions for fixing the box main body to the support member can be suitably selected in consideration of a configuration or the like of the box main body.

What is claimed is:

1. An electrical junction box to be mounted on a motor vehicle, the electrical junction box comprising:
   a box main body having a plurality of sides and an open end,
   an arm section projecting from one of said sides of the box main body that is loosely inserted into an attaching aperture in a support member of said motor vehicle wherein said arm section is engaged with said support member, and said box main body is fixed on said support member, said arm section is provided on a projecting distal end with an engaging portion that is inserted through said attaching aperture into an interior of said support member to be engaged with a rear surface of said support member, said arm section is integrally provided with a first wall portion that is opposed through said support member to said engaging portion, and said first wall portion is adapted to cover said attaching aperture.

2. An electrical junction box according to claim 1, wherein an insulator is adhered to a surface of said support member, said insulator is provided with a communication aperture that is communicated with said attaching aperture, and said arm section is integrally provided with a second wall portion for covering said communication aperture.

3. An electrical junction box according to claim 2, wherein said first wall portion is elastically deformable in a pushing direction onto said support member, and said engaging portion is pressed onto a rear surface of said support member by resilience of said first wall portion.

4. An electrical junction box according to claim 2, wherein said arm section is provided on said projecting distal end with a tapered sharp portion in a projecting direction of said arm section.

5. An electrical junction box according to claim 1, wherein said first wall portion is elastically deformable in a pushing direction onto said support member, and said engaging portion is pressed onto a rear surface of said support member by resilience of said first wall portion.

6. An electrical junction box according to claim 5, wherein said arm section is provided on said projecting distal end with a tapered sharp portion in a projecting direction of said arm section.

7. An electrical junction box according to claim 1, wherein said arm section is provided on said projecting distal end with a tapered sharp portion in a projecting direction of said arm section.

* * * * *